United States Patent [19]

Nakayama et al.

[11] Patent Number: 4,891,702
[45] Date of Patent: Jan. 2, 1990

[54] IMAGE EXPANSION APPARATUS

[75] Inventors: Tadayoshi Nakayama, Tokyo; Chikara Sato, Kawasaki, both of Japan

[73] Assignee: Canon Kabushiki Kaisha, Tokyo, Japan

[21] Appl. No.: 300,931

[22] Filed: Jan. 24, 1989

[30] Foreign Application Priority Data

Jan. 29, 1988 [JP] Japan .................................. 63-017413

[51] Int. Cl.⁴ ...................... H04N 5/262; H04N 1/393
[52] U.S. Cl. .................................... 358/140; 358/180; 358/451; 382/41
[58] Field of Search ........................ 358/140, 180, 287; 382/47

[56] References Cited

U.S. PATENT DOCUMENTS 4,774,581  9/1988  Shiratsuchi .......................... 358/180
4,792,856 12/1988  Shiratsuchi .......................... 358/180

Primary Examiner—Howard W. Britton
Attorney, Agent, or Firm—Fitzpatrick, Cella, Harper & Scinto

[57] ABSTRACT

An image expansion apparatus includes a FIFO-type image memory, writing and reading circuits for the image memory, and a plurality of cascade-connected delay circuits for sequentially delaying image data read out of the FIFO image memory. Image expansion in the main scanning direction is achieved by applying a delay to make the speed at which image data is read out of the FIFO image memory slower than that at which the image data is written in the FIFO image memory. Image expansion in the feed scanning direction is achieved by successively selecting and delivering outputs from delay circuits the number of which is equal to the magnification of the image.

21 Claims, 15 Drawing Sheets

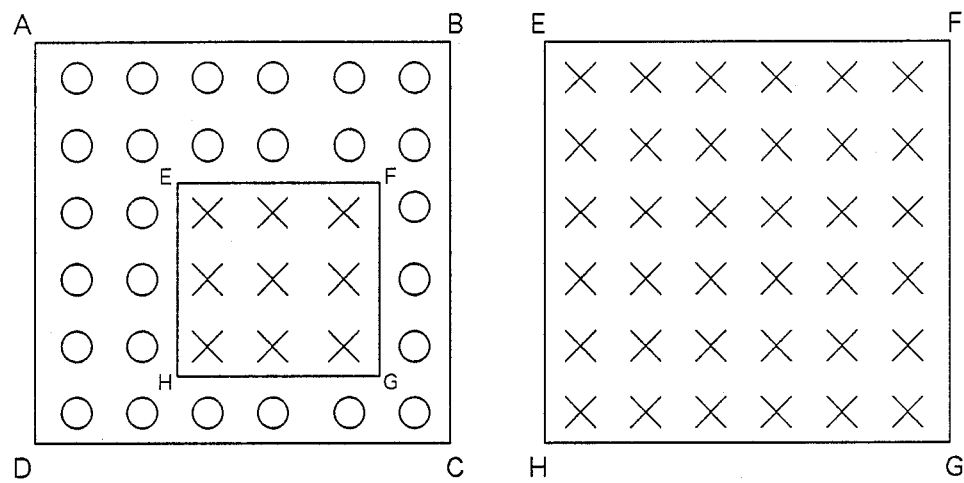
FIG. 2
FIG. 3
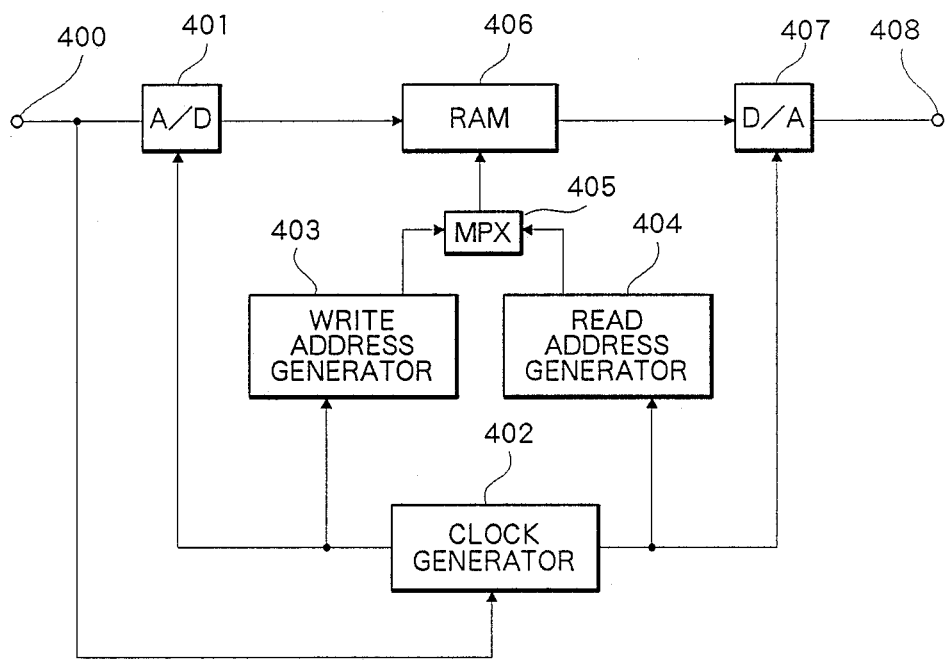
FIG. 4
PRIOR ART

IMAGE EXPANSION APPARATUS

BACKGROUND OF THE INVENTION

This invention relates to an image expansion apparatus for two-dimensionally expanding a video signal.

When an image is displayed on a monitor, ordinarily all of the information on a full frame is displayed on the monitor, but there are occasions when it is desired to display part of a frame in expanded form. For example, an area bounded by EFGH on a full frame (the area bounded by ABCD) shown in FIG. 2 can be expanded and displayed as shown in FIG. 3.

In the prior art, an expanded display of this kind is achieved by a circuit arrangement of the type illustrated in FIG. 4. In an apparatus that employs this circuitry, an analog video signal which enters from a terminal 400 is applied to an A/D converter 401 and to a clock generator 402. The latter produces a basic clock, which is necessary to operate the system, from a synchronizing signal contained in the video signal. At the timing of the clock received from the clock generator 402, the A/D converter 401 converts the analog video signal into a digital signal and applies the digital signal to a random-access image memory (RAM) 406. Meanwhile, the same clock signal applied to the A/D converter 401 is sent from the clock generator 402 to a write address generator 403, which produces a write address for the RAM 406. The write address is applied to the RAM 406 via an MPX (multiplexer) 405. The digital data received from the A/D converter 401 is written in the RAM 406 at the address specified by the signal from the write address generator 403.

An ordinary reading operation (namely a reading operation which does not involve expansion or compression) for reading the data written in the ROM 406 is performed as follows: First, a read address produced by a read address generator 404 is applied to the RAM 406 via the MPX 405, whereby the data written in the RAM 406 at this address is read out. The read data is delivered to a D/A converter 407, where it is converted into analog data. The analog data is outputted at a terminal 408. It is assumed here that addresses "01" through "36" as shown in FIG. 5 are assigned to the pixels in the frame shown in FIG. 2. The addresses generated in the ordinary reading operation mentioned above are illustrated in (a) of FIG. 6. The addresses are generated in order from "01" to "36".

An expanded display of the data written in RAM 406 is achieved as follows: Assume that the area EFGH of pixel addresses "15", "16", "17", "21", "23", "27", "28", "29" in FIG. 5 is to be expanded by a factor of 2. In such case, expansion of the display will be possible if the read addresses shown in (b) of FIG. 6 are generated. In this example, each pixel of the area to be enlarged is read out twice in both the main scanning direction and feed scanning direction.

This conventional apparatus for expanding an image involves the following shortcomings:

(1) The apparatus is premised on use of a RAM as a work area for image processing.

(2) Consequently, in order to produce address information to be applied to the RAM, two address generators are required, one which produces addresses for forming a space prior to expansion and one which produces addresses for forming a space after expansion.

(3) When an image signal from, say, a video camera or the like is to be expanded and displayed in real time, use of the RAM necessitates complicated peripheral circuitry for controlling the writing and reading operations of the RAM. This raises cost and enlarges the scale of the circuitry correspondingly.

SUMMARY OF THE INVENTION

An object of the present invention is to provide an image expansion apparatus provided with an image memory for temporarily storing an image, in which expansion in the main scanning direction is achieved by making the speed at which data is written into the image memory different from that at which data is read out of the image memory, and in which expansion in a feed direction is delayed by an amount corresponding to an enlargement (magnification) factor by providing delay circuitry, the arrangement being such that delayed image data from each delay means can be repeatedly outputted in the feed direction.

Another object of the present invention is to provide an image expansion apparatus which utilizes a FIFO-type image memory in order to minimize peripheral circuitry such as address generating circuitry.

Still another object of the present invention is to provide an image expansion apparatus which uses a FIFO-type image memory, wherein the amount of image data written in the FIFO image memory is equivalent to the total number of pixels of the original image divided by the magnification at which expansion is performed, thereby making possible a successive change in the expanded area.

A further object of the present invention is to provide an image expansion apparatus in which the number of delay circuits used for expansion in the feed direction is minimized.

Yet another object of the present invention is to provide an image expansion apparatus which suppresses unnatural edges produced with expansion in the feed direction.

According to the present invention, the foregoing objects area attained by providing an image expansion apparatus for expanding an image two-dimensionally, comprising an image memory for temporarily storing image data inclusive of an area to be expanded, reading means for successively reading image data, which has been written in the image memory, out of the image memory at a speed different from that which the image data was written in the image memory, delay means for delaying, by a predetermined period of time, the image data read out of the image memory, and selecting means for alternately selecting, at a predetermined time interval, image data which has and has not passed through the delay means.

In an embodiment of the invention, the apparatus is an apparatus for expanding an image in a horizontal direction and a vertical direction, and further comprises writing means for writing image data, which has been read by a raster scanning method, in the image memory. The reading speed of the reading means is decided based on the magnification at which expansion is performed in the horizontal direction and the speed at which the image data is written in the image memory. The delay means delays the image data for a period of time decided based upon a number of pixels, which is decided on the basis of a number of pixels of the image in the horizontal direction and magnification in the vertical direction, and the speed at which the data is read out of the image memory.

In the foregoing embodiment, the delay means has a number of shift register means corresponding to the magnification in the vertical direction, these shift register means being cascade-connected, each shift register means having a capacity for the number of pixels of the image on one horizontal line. The selecting means selects final-stage outputs of the shift registers in sequential order.

Also in the foregoing embodiment, the relation $m = k \times M$ holds, where $m \times m$ is the size of an original image, $k \times k$ is the size of the area to be expanded, and magnification is M in both a main scanning direction and a feed scanning direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2 and 3 are views useful in describing the manner in which an image in a certain area is expanded;

FIG. 4 is a circuit diagram of the prior art;

DESCRIPTION OF THE PREFERRED EMBODIMENTS

Reference will now be had to the accompanying drawings to describe embodiments in which the present invention is applied to an image expansion display apparatus which receives an analog video signal from a video camera as an image input signal and employs a FIFO-type image memory as an image memory. First through third such embodiments are described, as well as modifications of the first and second embodiments.

The first embodiment (FIG. 1) is an example in which an image is expanded by a factor of 2 vertically and horizontally, and the modification thereof (FIG. 17) is an example in which the image is expanded by a factor of 4. The second embodiment (FIG. 19A) is an example in which an image is expanded by a factor of 4 vertically and horizontally, with this embodiment being designed to have a smaller number of delay circuits. A modification (FIG. 20A) of the second embodiment is designed to have improved edge processing. The third embodiment (FIG. 21) differs from the first and second embodiments in that the delay circuitry is positioned on the input side rather than the output side of the FIFO image memory.

The image expansion apparatus in these embodiments mainly is used in a system (the arrangement of FIG. 7A) in which an image picked up by a video camera is expanded in real time and then displayed on a CRT or the like. However, the apparatus can be applied also in a system (FIG. 7B) in which an image temporarily stored in an external memory is read out and expanded, or a system (FIG. 7C) in which an image following its expansion is temporarily stored in a memory rather than being outputted immediately.

<Relation between image size and magnification>

Figure 8:
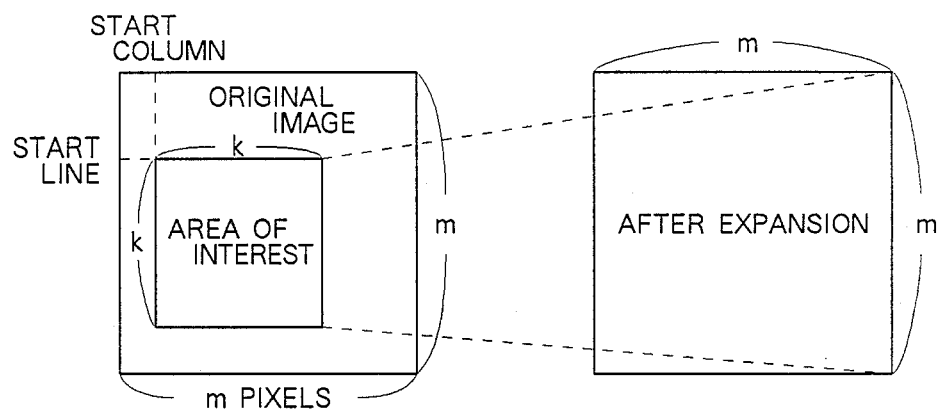
FIG. 8 is a view for describing the relation among the size and expansion magnification of an original image and the size of area to be expanded.

FIG. 8 is a view useful in describing the relation among the size of an original image, an image area within the original image that is desired to be expanded, and the magnification of expansion in the image expansion apparatus of the first and third embodiments. In FIG. 8, assume that the size of an original image (the zone imaged by a camera or the like) is $m \times m$ pixels, and that the size of the area to be expanded (also referred to as an area of interest) is $k \times k$ pixels. These embodiments are premised on the fact that if the area of interest is enlarged M times, the size of the area following expansion will be $m \times m$ pixels. In other words, $$m = k \times M$$

will hold. The reason for this premise is as follows:

The ability to expand any area of interest at various magnifications necessitates a very large amount of complicated circuitry. However, there is little need to strictly specify the area of interest, for it will suffice if the image desired to be seen up close is contained within the frame after expansion. Furthermore, there is also little need to expand an image at a wide variety of magnifications; expansion at magnifications of 2X, 3X, 4X and at most 12X, for example, is sufficient. Accordingly, in the image expansion apparatus to be described below, absolutely no practical problems arise even if it is assumed that the relation $m = k \times M$ holds among the size m of the original image, the size k of the area to be expanded, and the magnification M. That is to say, in the image expansion apparatus of the embodiments to be described, magnifications 2X and 4X are cited as examples, but the concept illustrated by the embodiments is applicable to any magnification. This will become clear from the descriptions to follow.

The "start line" and "start column" depicted in FIG. 8 are provided in order to improve the operability of the image expansion apparatus of the invention by making it possible to designate the approximate position of the area to be expanded. By setting the "start line" and "start column," the desired area can be expanded at the maximum magnification and displayed over the entire display screen. As will become apparent from the following embodiments, the "start line" reflects a FIFO image memory control signal WENB, and the "start column" reflects a delay circuit (described below) control signal SEL.

Figure 9:
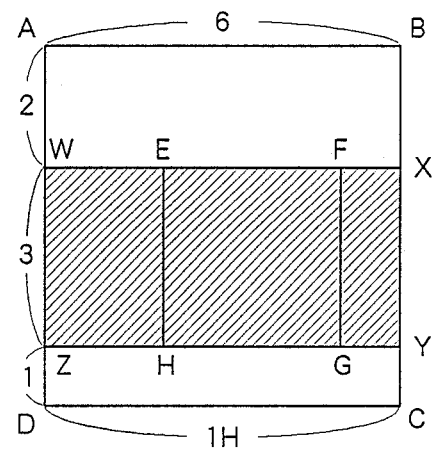
FIG. 9 is a view showing the relation between an original image and an area to be expanded when expansion is performed at magnification 2X.

For the foregoing reasons, the principle of the image expansion apparatus of the embodiments is applicable to any m, k, M so long as the relation $m = k \times M$ is satisfied. Therefore, in the apparatus of the first embodiment described hereinbelow, it will be assumed that the area ABCD shown in FIG. 9 is the "original image" and that the area EFGH is the area to be expanded (the area of interest) in order to simplify the description. In addition, a horizontal line WX shall be an "expansion start line", and a vertical line shall be an "expansion start column". Furthermore, in order to facilitate a comparison with the prior-part apparatus (FIG. 4), the areas shown in FIG. 9 shall be the same as those depicted in FIG. 5. In the second embodiment wherein expansion is performed at a magnification of 4X, use is made of the image shown in FIG. 18.

<FIFO-type image memory>

In the apparatus of the first through third embodiments, an image memory referred to as an FIFO-type field image memory (e.g., a memory TMS4C1050 manufactured by Texas Instruments) is employed as an image memory. Before describing the image expansion apparatus, the operation of this FIFO-type field image memory will be explained in simple terms.

Figure 10:
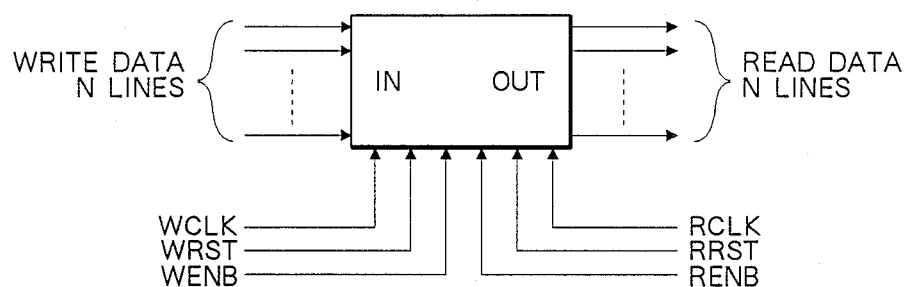
FIG. 10 is a view showing the arrangement of a FIFO-type image memory used in all embodiments of the apparatus.

As shown in FIG. 10, the FIFO image memory has N write lines (IN) and N read lines (OUT) for reading and writing N-bit digital data. In addition to these $2 \times N$ data lines, lines are required for clock signals (WCLK, RCLK) and control signals (WRST, RRST, WENB, RENB) for writing and reading purposes. These signals are as follows:
 WCLK: write clock
 WRST: write reset signal
 WENB: write-enable signal
 RCLK: read clock
 RRST: read rest signal
 RENB: read-enable signal
The functions of these signals will now be described in brief.

The clock signals (WCLK, RCLK) are pulse signals applied in order to input digital data to or output digital data from the FIFO image memory.

Figure 11:
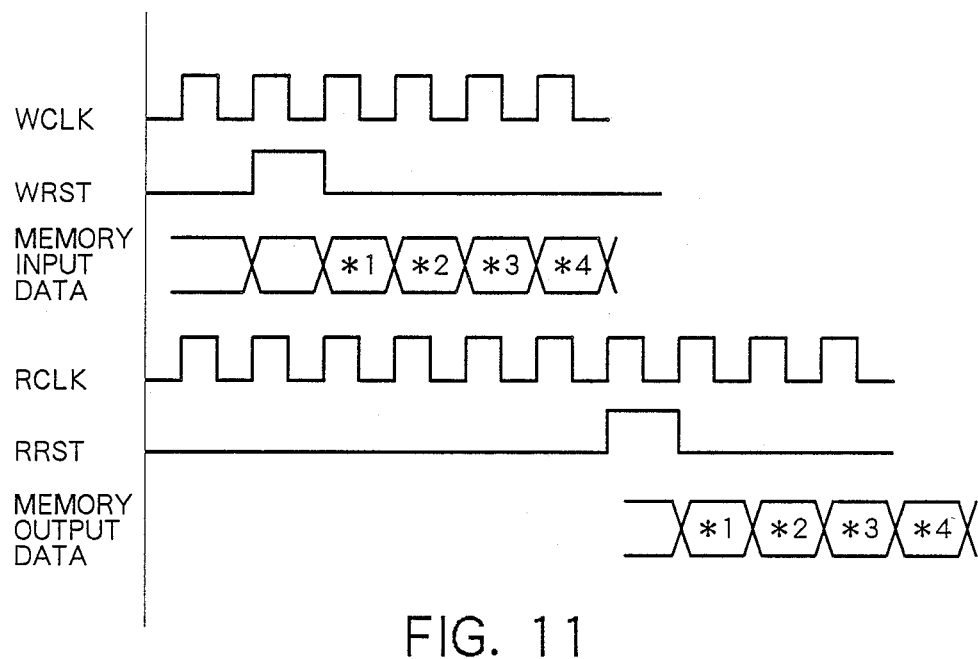
FIGS. 11 and 12A, 12B are views for describing the general operation of the FIFO-type memory.

The reset signals (WRST, RRST) are signals for resetting locations at which data are written in and read from the FIFO image memory, respectively. More specifically, following entry of the WRST signal, the data is written in at the beginning of the FIFO image memory. When the RRST signal is entered, the data is read out in order from the beginning of the memory. An example of this is shown in FIG. 11, in which the mark "*" represents data written in the image memory. When there is a WRST input, the data *1 represents the first written data, with regard to data *1, *2, *3, *4... written in after the WRST input. When the RRST signal is entered, the data *1, *2, *3, *4... are outputted by the FIFO image memory in synchronization with the signal RCLK. According to the example of FIG. 11, the signals WCLK and RCLK are set to the same frequency only because this is convenient in facilitating an understanding of the FIFO memory operation. In the embodiments of the image expansion apparatus to follow, WCLK and RCLK are set to different frequencies so that image expansion can be carried out.

The enable signals WENB, REND are signals which control whether or not an operation for writing data in the image memory and an operation for reading data out of the image memory, respectively, are to be made possible.

Figure 12A:
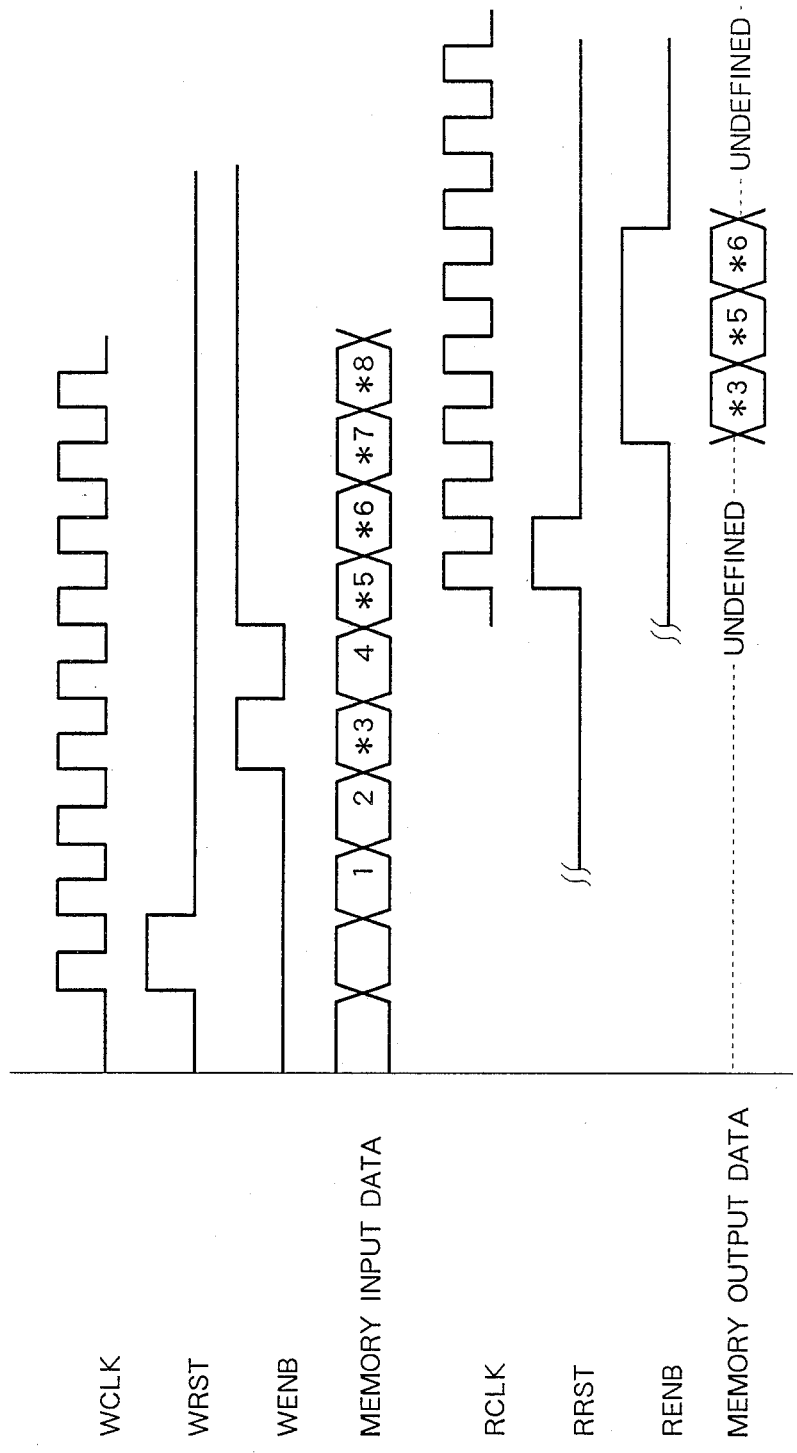

The correspondence between the input data to the FIFO image memory and the output data from the FIFO image memory can be changed in various ways based on the combination of reset signals and enable signals. One example of this is depicted in FIG. 12A. Here WENB becomes logical "1" for the duration of one clock period three clock pulses after the reset signal WRST, and then reverts to logical "0" for one clock period before returning to logical "1", which holds from this point onward. In this example, the data written in the FIFO memory first following the WRST inputs is *3, after which the data actually written is *5, *6, *7, *8, . . . and so on. Accordingly, the data which has been stored in the FIFO image memory at this point in time is *3, *5, *6, *7, *8, . . . , in consecutive order. When the RENB signal is made "1" for the duration of three pixels, *3, *5, *6 are outputted from the FIFO image memory in order.

As will be understood from FIG. 12A, the characterizing feature of this FIFO image memory is that even if data is written in the FIFO image memory in two operations separated in time from each other (meaning that WENB becomes logical "1" twice), as in the case of data *3 and data *5, *6, *7, these items of data are stored in the FIFO image memory in succession. Another characterizing feature is that it is possible to change the periods of the write clock WCLK and read clock RCLK because the write and read operations are performed independently of each other. (In other words, it is permissible for the write speed and read speed to differ). This means that destruction of the data in the FIFO image memory will not occur so long as WRST is not outputted consecutively two or more times on the write side before a read operation is performed on the read side with regard to a given item of data.

<Principle of expansion>

The principle of the image enlargement apparatus according to the first and second embodiments will now be described.

Figure 12B:
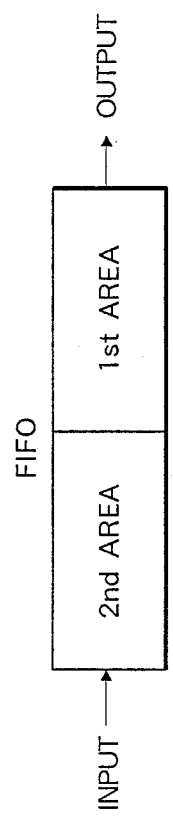

It should readily be appreciated from the foregoing discussion of the operation of the FIFO image memory that image expansion in the main scanning direction can be realized, without destroying data in the FIFO image memory, by making the period of RCLK larger than that of WCLK. In other words, in a case where image data read in a raster scanning system is displayed in expanded form by using a FIFO image memory, the period of RCLK should, in principle, be set to be M times larger than that of WCLK in order to achieve a magnification M in the main scanning direction (i.e., RCLK should be subjected to frequency division 1/M). FIG. 12B illustrates the relationship between the periods of WCLK and RCLK when expansion is performed at a magnification 2X in the horizontal direction.

Achieving expansion at magnification M in the feed scanning direction is performed as follows: For a simple expansion in the feed scanning direction, it will suffice to repeat the image data on one original line M times in the feed scanning direction. Therefore, the image data on the original one line, image data obtained as a result of delaying the original image data by an interval of 1H, image data obtained as a result of delaying the original image data by an interval of 2H, . . . , and image data obtained as a result of delaying the original image data by an interval of (M−1)H are arrayed in order in the feed scanning direction, and these delayed items of image data are selected in order in synchronization with scanning in the feed scanning direction. In this way image expansion can be achieved in the main scanning direction and feed scanning direction. It should be noted that the interval 1H is the time needed to raster scan H-number of pixels on one line in the main scanning direction of the original image. If $$\text{period of RCLK} = 2 \times \text{period of WCLK}$$

holds and scanning is performed in sync with WCLK, then the following will hold:

$$1H \text{ interval} = H \times WCLK$$

<FIRST EMBODIMENT>

Figure 1:
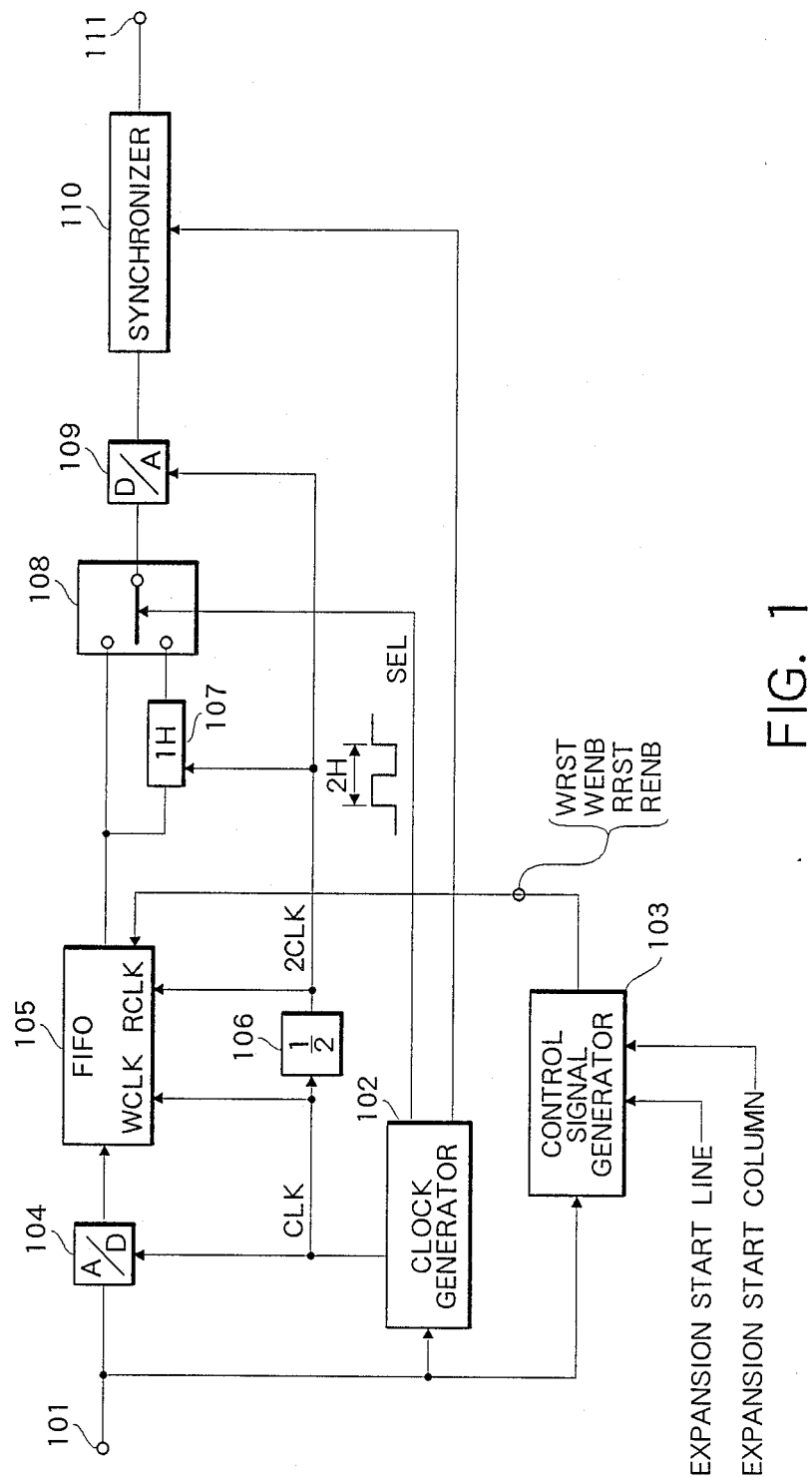
FIG. 1 is a circuit diagram illustrating a first embodiment of an image expansion apparatus according to the present invention.

A first embodiment of the apparatus is directed toward a two-fold image expansion in both the main scanning and feed scanning directions. The detailed construction of the apparatus is shown in FIG. 1. The apparatus has a terminal 101, at which an analog image signal obtained as a result of image pickup performed by a television camera or the like is applied. The apparatus includes a clock generator 102 for generating a clock signal used by the apparatus, an A/D converter 104 for converting the analog data into digital data, a FIFO image memory 105 the same as that shown in FIG. 7, a ½ frequency divider 106 for halving the frequency of its input signal, a 1H delay circuit 107 constituted by a shift register, a selector 108 for selecting one of two inputs applied thereto, a D/A converter 109 for converting the digital signal from the selector 108 into an analog signal, and a circuit 110 for applying a synchronizing signal to the analog signal from the D/A converter 109. Also provided is a circuit 103 which generates the abovementioned control signals for controlling the FIFO memory 105. The apparatus has an output terminal 111 from which expanded image data is outputted along with the synchronizing signal.

Figure 13:
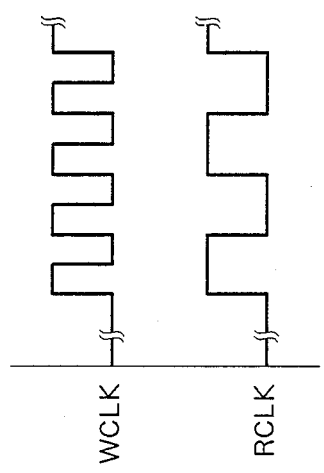
FIG. 13 is a view for describing area division of the FIFO-type memory used in the present embodiments.

As shown in FIG. 13, the FIFO memory 105 is set so as to have a capacity equivalent to a maximum of two fields. The reason for this is to make it possible to write one field of image data while one field of image data written just before is being read out. It should be noted that one field referred to here corresponds to the image data of the pixels in the area WXYZ in case of FIG. 9. In this case, since the relation $m = k \times M$ holds as mentioned above, one field as referred to in this specification is an amount which is 1/M of $m^2$-number of pixels of the original image.

$$\text{one field} = m^2/M$$

Accordingly, in the first embodiment where expansion is performed to double the size of the image, one field is equivalent to 18 pixels.

The operation of the circuit shown in FIG. 1 will now be described.

The analog image signal which enters the terminal 101 is applied to the A/D converter 104 and delivered to the clock generator 102 and control signal generator 103. On the basis of a horizontal synchronizing signal and burst signal contained in the analog image signal, the clock generator 102 produces the basic clock CLK for operating the system of the embodiment shown in FIG. 1. This clock is delivered to the A/D converter 104 and ½ frequency divider 106. The basic clock CLK is also applied to the FIFO image memory 105 as the write clock signal WCLK. On the basis of vertical and horizontal synchronizing signals contained in the analog image signal, the control signal generator 103 produces four types of control signal (WRST, WENB, RRST, RENB) for controlling the FIFO memory 105. These signals are applied to the FIFO memory 105. At the period of the basic clock CLK which arrives from the clock generator 102, the A/D converter 104 converts the analog image signal into digital data, which is delivered to the FIFO memory 105. This digital data is written in the FIFO memory 105 under the control of the control signals WRST, WENB and at the period of the write clock WCLK.

Meanwhile, the write clock WCLK is converted into a clock signal (2CLK) having half the frequency of the clock CLK by the ½ frequency divider 106, and this clock signal is applied to the FIFO memory 105 as the read clock RCLK. The image data that has been written in the FIFO memory 105 is read out of the memory under the control of the control signals RRST, RENB and at the period (2CLK) of the read clock RCLK. The data read out FIFO memory 105 is delivered to one input terminal of the selector 108 and to the 1H interval delay circuit 107. The latter delivers its output to the other input terminal of the selector 108.

The selector 108 receives pulses having a period 2H from the clock generator 102 as a control signal SEL and is adapted to select one of its two inputs and output the selected input to the D/A converter 109. The latter converts the data from the selector 108 into an analog image signal at the period of the read clock (RCLK =2CLK), and the analog image signal is delivered to the synchronizing circuit 110. The latter receives a blanking signal and a composite synchronizing signal from the clock generator 102 and subjects the analog image signal to blanking processing, after which the blanked signal is delivered to the terminal 111 along with the composite synchronizing signal.

Figure 14:
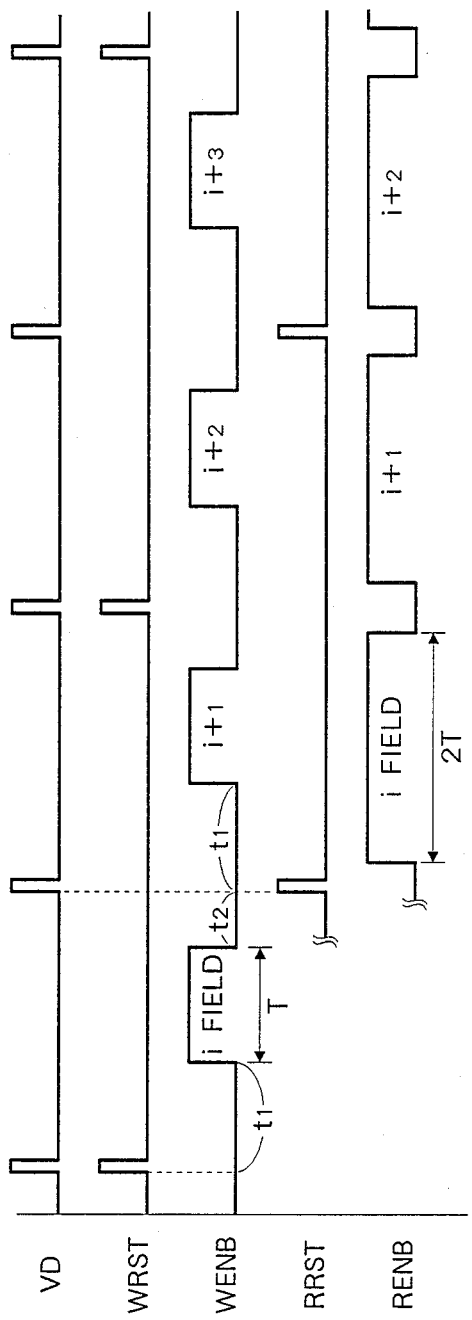
FIGS. 14 and 15 are timing charts for describing the operation of the FIFO-type memory used in the first embodiment of the expansion apparatus.

The timings of the control signals generated by the control signal generator 103 will be described next. FIG. 14 illustrates the timings of the control signals in a case where the area bounded by EFGH in FIG. 9 is to be expanded and displayed over a full screen using the apparatus of the first embodiment. VD in FIG. 14 represents the positions of vertical synchronization of the input image signal. More specifically, the interval between adjacent VD pulses corresponds to one field of one frame. In the first embodiment, since the FIFO memory 105 has a capacity equivalent to two fields (FIG. 13), the control signal generator 103 generates one write reset signal WRST, thereby initializing the write location in the FIFO memory 105, whenever two VD pulses are generated, namely every two fields. The reset signal RRST used for the reading operation is generated at the same period as the WRST signal, but the point in time at which it is generated is that at which the first area, of the two areas equivalent to two fields, is written in the FIFO memory 105. In other words, the WRST and RRST signals have the same period (a period equivalent to two fields) but they are staggered from each other by one-half period. As for the correspondence between the two areas stored in the FIFO memory and each field shown in FIG. 14, the first area corresponds to an i field and and (i+2) field, and the second area corresponds to an (i+1) field and an (i+3) field.

Figure 15:
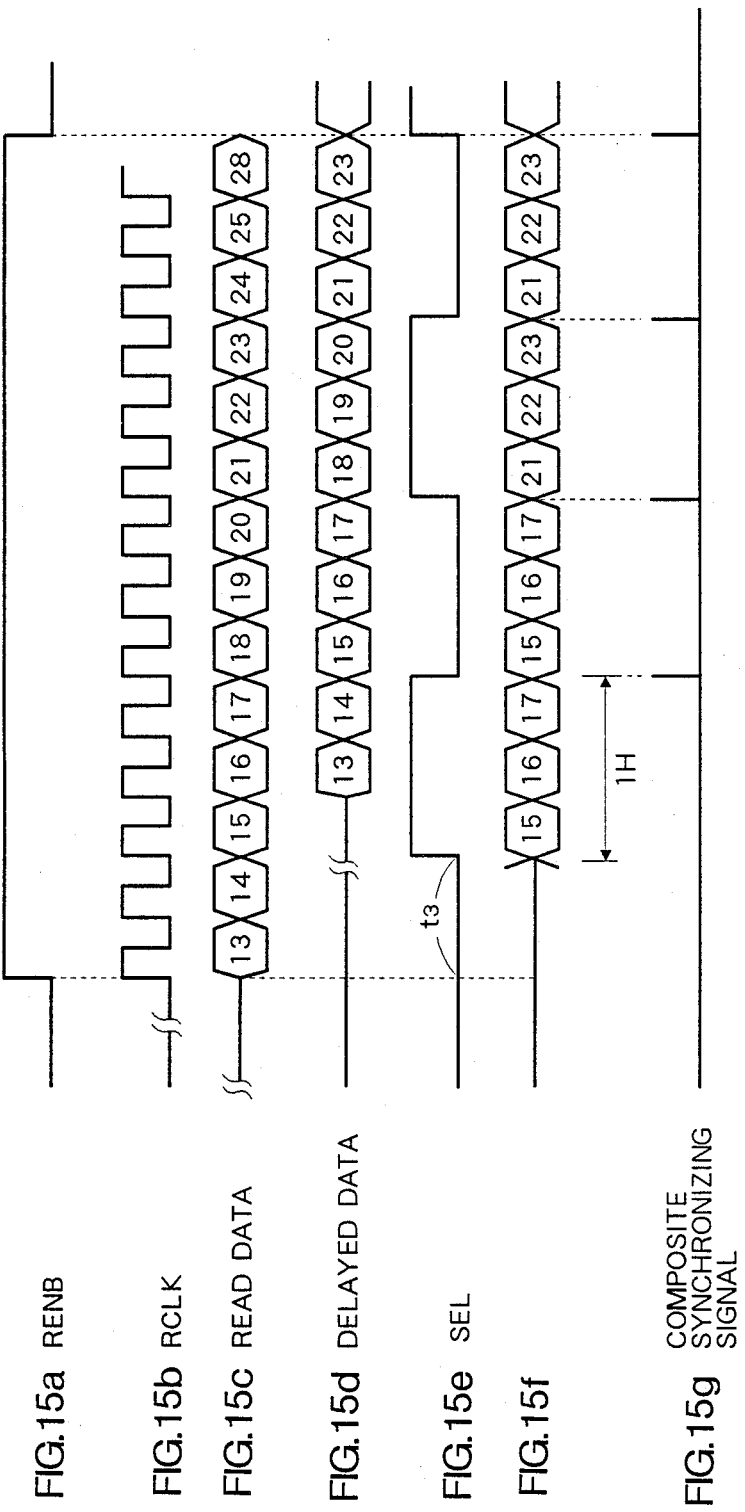

The timing for generation of WENB, RENB will now be described with reference to FIGS. 14 and 15.

The image to be expanded (the area of interest) is as shown in FIG. 9. Here the original image ABCD has a size of 6×6, while that of the area of interest EFGH is 3×3. An area ABXW has a size of 6×2 (=a length of 2H pixels), an area WXYZ a size of 6×3 (=a length of 3H pixels), and an area ZYCD a size of 6×1 (=a length of 1H pixels). The control signal WENB necessary in order to expand the portion EFGH of this image by a magnification 2X is one which rises to logical "1" a time $t_1$ (=2H interval) after WRST is generated remains at "1" for the duration T (=3H duration), and then reverts to logical "0" for a time $t_2$ (=1H duration). As a result, the first field of image data after detection of VD is written in the FIFO memory 105. When the next VD pulse is detected, the read rest signal RRST is generated but not the WRST signal, as described earlier. When this is accomplished, the first field of image data is read out of the FIFO memory 105 in synchronization with the clock whose period is twice that of WCLK (this clock being supplied by the frequency divider 106).

The second area is written in the FIFO memory 105 in concurrence with this read operation. The writing of the second area is performed in a region contiguous to the first area. In other words, WENB remains at logical "0" over the duration $t_1$ (=2H duration) following detection of the second VD pulse, is at logical "1" over the next interval T, and reverts to "0" for the duration $t_2$. Reading of the first area ends about when writing of the second area ends. When the third VD pulse is detected, WRST is generated, so that the location at which data is written in the FIFO memory 105 is reset to the beginning of the first area. However, the read location is within the second area because RRST is not generated. Thus, the writing of the (i+2) field in the first area of the FIFO memory and the reading of the (i+1) field from the second area of the FIFO memory are performed concurrently.

The data that has been written in the FIFO memory 105 is read out at a speed half that of the writing operation, as a result of which expansion at magnification 2X is achieved in the main scanning direction. On the other hand, since the speed of the reading operation is halved, the read duration (the interval 2T over which RENB is "1") becomes twice the write duration (the interval T over which WENB is "0").

Figure 5:
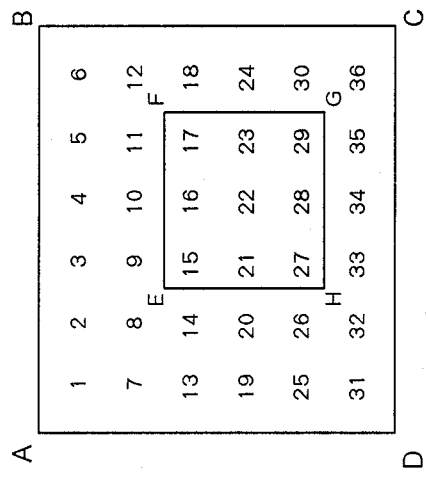
FIG. 5 is a view illustrating the arrangement of pixels of an image.
Figure 6:
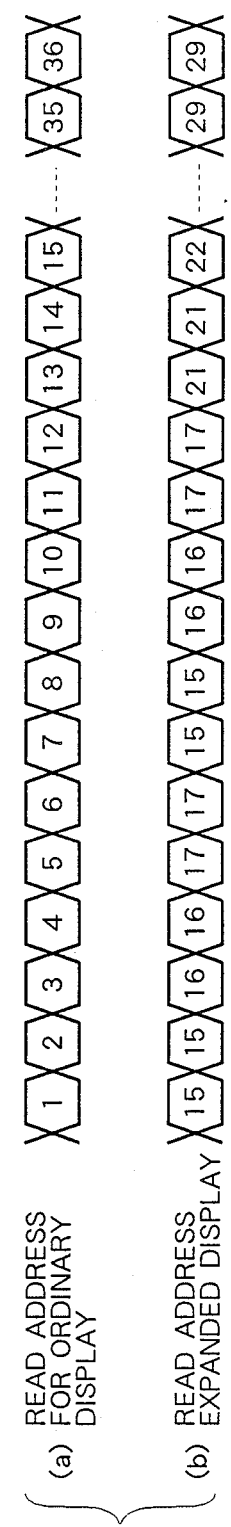
FIG. 6 is a view for describing the manner in which addresses are produced when expanding an image in accordance with the prior art.

In order to facilitate an understanding of the embodiment, the manner in which image expansion is performed will be described assuming that the numbers shown in FIG. 5 are assigned to the pixels contained in the image. The data read out of the FIFO memory 105 in this case will be as shown in FIG. 15(c) in accordance with the control set forth above. It is noteworthy that sine the period of RCLK is twice that of CLK, the length of each item of image data shown in FIG. 15 is twice that at the time of the write operation. The read data is delayed for the duration 1H by the delay circuitry 107. The delayed data that results is as shown at (d) in FIG. 15. FIG. 15(e) illustrates the timing of the control signal SEL of selector 108. The signal SEL rises to logical "1" after a time delay $t_3$ from the signal RENB, remains at "1" for the duration 1H, and then reverts to "0" for the duration 1H. The signal SEL rises to "1" for the duration 1H and then reverts to "0" for the duration 1H again. As a result, a changeover is effected between the data [(c) in FIG. 15]read out of the FIFO memory 105 and the delayed data [(d) in FIG. 15]. In other words, when SEL is logical "1", the image data which is the direct output of the FIFO memory 105 is selected, whereas when SEL is logical "0", the delayed image data is selected. The data that results from this selection processing is shown at (f) in FIG. 15. The composite synchronizing signal of FIG. 15(g) is generated at the image line changeover following expansion.

In general, the signal SEL has a period equivalent to the duration 2H, the duty ratio thereof being 50%. The change 1→0 is repeated k times, which is the size of the area of interest. What should be noted here is the phase relationship between the control signal SEL and the read data. In FIG. 15, SEL is made "1" at the third pixel after RENB becomes "1". This is because the "start column" of the area of interest EFGH begins from the third pixel at each line. That is, the length of the delay time $t_3$ from RENB to SEL is as follows:

$t_3$ = start column position × period of RCLK

Figure 16:
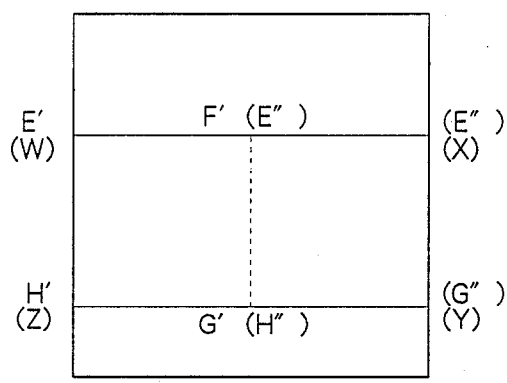
FIG. 16 is a view for describing the manner in which an expanded area is shifted in accordance with the first embodiment.

Assume that the clock generator 102 changes $t_3$ from "0" until the duration 2H. In such case, the expanded area will change within a range between the area E'F'G'H' and the area E"F"G"H" shown in FIG. 16. In other words, designating which rectangular portion in the area WXYZ of FIG. 16 is to be expanded is the same as designating the phase of the SEL signal. Accordingly, the image expansion apparatus of the invention should be provided with some means capable of variably designating and inputting the SEL signal generation timing. In addition, one field (which corresponds to the shaded area WXYZ shown in FIG. 9) starting from the "start line" is written in the FIFO memory 105, as in the first embodiment. As to which portion in this one field is to be eventually expanded, desired areas can be explained in successive fashion if the timing at which the signal SEL is generated is successively varied, relative to RENB, in dependence upon the input from the abovementioned designating input means. In the prior art, the area desired to be enlarged is extracted and stored in a working memory, after which the extracted area is expanded to obtain the enlarged image. This means that when the area of interest is to be changed, it is necessary to extract the area again and restore it in the working memory. As a result, image expansion in real time is difficult. By contrast, with the apparatus of the first embodiment (and of the second and third embodiments to be described below), once the area WXYZ has been written in the FIFO memory 105, it is possible to change the area of interest continuously if desired. That is to say, this can be easily accomplished merely by obtained a circuit arrangement in which only one field starting from the "start line" is written in the FIFO memory

<MODIFICATION OF FIRST EMBODIMENT>

Figure 18:
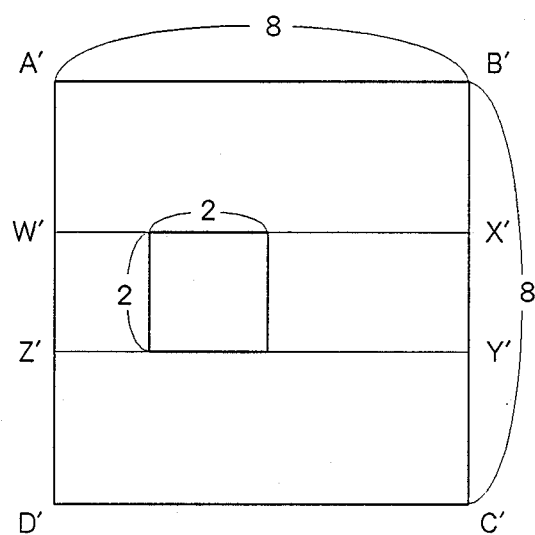
FIG. 18 is a view for describing the relation between an original image and an area to be expanded in an image expansion apparatus according to a modification of the first embodiment.
Figure 17:
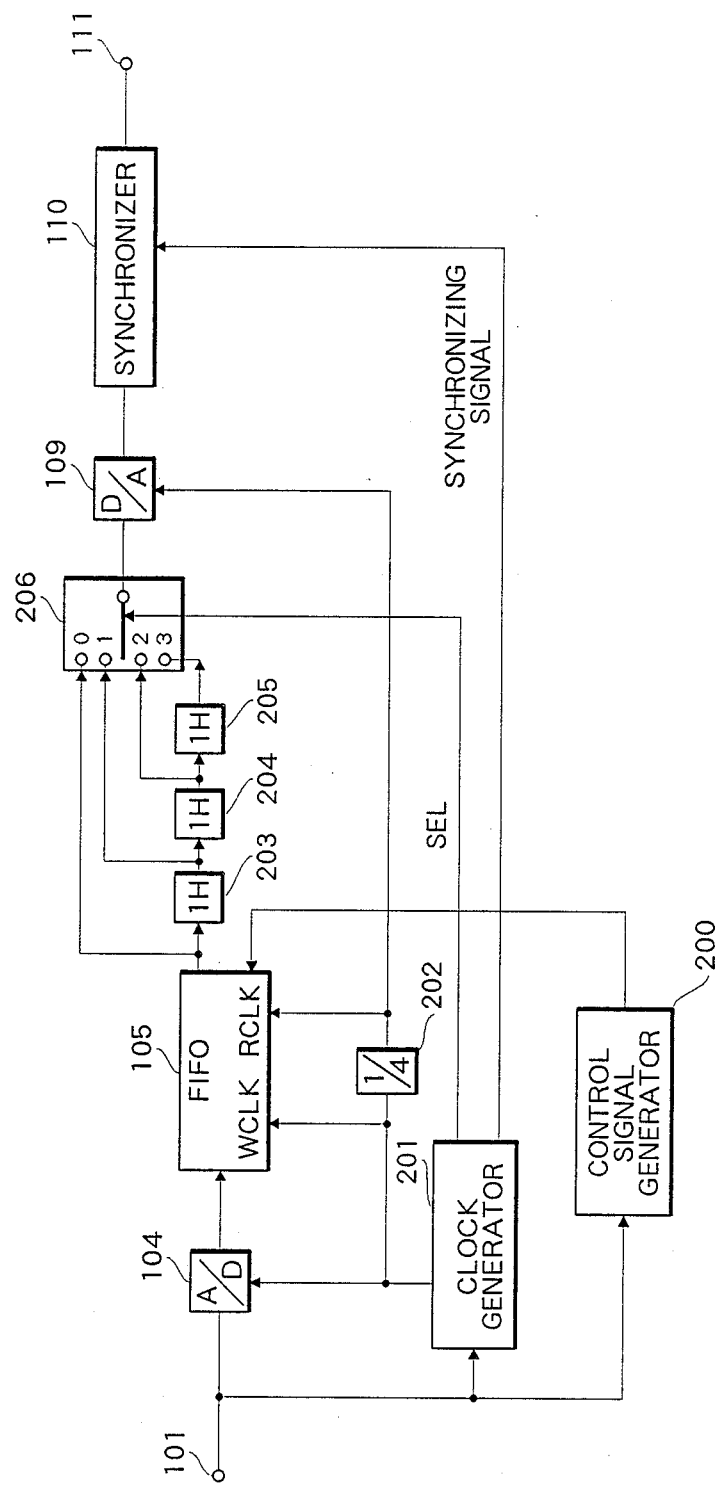
FIG. 17 is a block diagram of an apparatus for expanding an image at magnification 4X in accordance with a modification of the first embodiment.

In a modification of the first embodiment, image expansion is performed to enlarge an image fourfold M=4). This modification is shown in FIG. 17. This modification differs from the first embodiment in that the period of RCLK is made four times that of WCLK, three delay circuits are required, a four-input type selector is required, and the original image is as indicated in FIG. 18. In other aspects this modification is identical with the first embodiment. Also, blocks identical with those of the embodiment shown in FIG. 1 are designated by like reference characters. In FIG. 18, the original image A'B'C'D', having a size 8×8, and the image of interest has a size 2×2. In FIG. 18, one field is composed of pixels in the area bounded by W'X'Y'Z' starting from the "start line", or more specifically, $$64 \times \frac{1}{4} = 16 \text{ pixels}$$

This modification will now be described in simple terms.

Numeral 200 in FIG. 17 denotes a control signal generator which, like the generator 103 of the first embodiment, generates WRST, RRST, WENB, RENB, etc. It will suffice if the phase relationship among WRST, RRST, WENB, RENB is the same as in the first embodiment. The control signal generator 200 provides the FIFO memory 105 with the signal WENB, which is at logical "1" for a period of time equivalent to one field. The FIFO memory 105 writes digital image data over this interval. The data that has been written is read out at the timing of the read clock (RCLK), which is the result of dividing the write clock (WCLK) by 4, performed by a frequency divider circuit 202. The read data is applied to one input terminal of a selector 206, and to a group of three cascade-connected delay elements 203, 204, 205. The outputs of these delay elements 203, 204, 205 are applied to respective input terminals of the selector 206.

In this modification, an image is enlarged fourfold in the horizontal and vertical directions; hence, it is required that the same information line (scanning line) be displayed four times in succession. To this end, signals delayed by the durations 1H, 2H and 3H are generated by the delay elements 203, 204, 205, respectively. A changeover among an undelayed signal and the signals delayed by 1H, 2H and 3H is performed by the selector 206 in 1H units in response to the control signal SEL, and the selected signal is delivered to the D/A converter 109. If the select signal SEL possesses, say, the logic values 0, 1, 2, 3 expressed by two bits, then it will be possible for the selector 206 to select any one of four inputs.

The control signal necessary for this selection is generated by the clock generator 201 based on the synchronizing signals contained in the analog input image signal.

In the modification of FIG. 17, the same image expansion apparatus can be applied to expansion at magnification 2X or 4X, by way of example, if the frequency divider 202 is modified so as to generate a clock whose frequency is $\frac{1}{2}$ or $\frac{1}{4}$ of the input frequency, depending upon whether magnification 2X or 4X is selected, and the clock generator 201 is adapted in such a manner that logic values 0, 1 (i.e., one bit) or logic values 0, 1, 2, 3 (i.e., two bits) can be obtained depending upon whether magnification 2X or 4X is selected.

<SECOND EMBODIMENT>

Figure 19A:
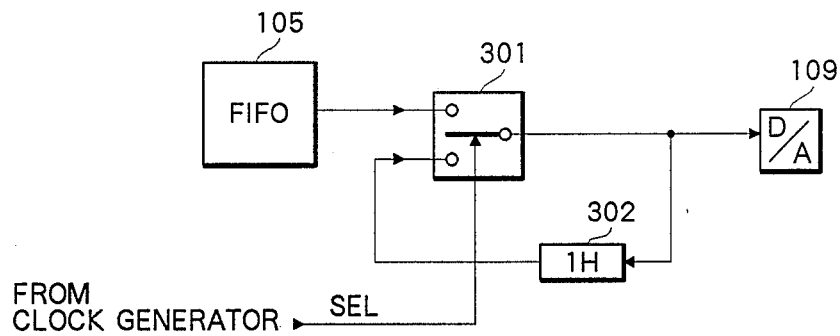
FIG. 19a is a block diagram illustrating a second embodiment of an image expansion apparatus according to the invention.

In the first embodiment and modification thereof, M-number of delay circuits are required for expansion at magnification M in the feed scanning direction. This second embodiment of the invention is directed toward reducing the number of delay circuits needed. The construction of this embodiment is shown in FIG. 19A. The image expansion apparatus of FIG. 19A has one delay element 302 and is characterized in that any desired magnification can be obtained merely by changing the duty ratio of the control signal SEL that controls a selector 301. The characterizing feature resides in the fact that the output of the selector 301 is fed back to the 1H delay element. Relying upon such feedback makes it possible to dispense with the plurality of delay circuits used in the modification (FIG. 17) of the first embodiment.

Figure 19B:
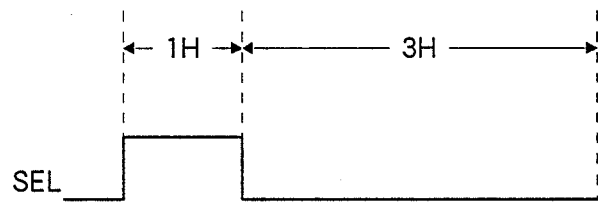
FIG. 19B is a view for describing the duty ratio of a control signal SEL in a selection circuit in the second embodiment.

More specifically, as shown in FIG. 19B, the control signal SEL for controlling the selector 301 is made logical "1" for the duration 1H and logical "0" for the duration 3H. Consequently, the selector 301 selects the output of the FIFO memory 105 while SEL is at "1" and delivers this undelayed signal to the D/A converter 109. When SEL is "0", the output of the delay circuit 302 is connected to one input of the selector 301, so that the inputs to the D/A converter 109 are image signals delayed by 1H, 2H and 3H.

In accordance with the second embodiment, any desired magnification in the feed scanning direction can be obtained merely by providing one 1H delay circuit and changing the duty ratio of the control signal SEL.

<MODIFICATION OF SECOND EMBODIMENT>

With the modification of the first embodiment and the second embodiment, expansion is in the vertical direction. Consequently, the same information is repeatedly displayed in the feed scanning direction successively over a plurality of lines. However, in a case where a diagonally extending edge is present in the original image, this diagonal edge will become a vertical edge in two successive or four successive lines if a display is presented as described above. In the expanded image, the vertical edge appears at rapidly changing positions every two or four lines. The result is an unsightly enlarged image. This is shown in FIG. 20B. Accordingly, in the modification of the second embodiment, the information on lines at which the information changes is averaged and the averaged information is displayed. As a result, the change in edge position is smoothened somewhat. The circuitry for achieving this is as shown in FIG. 20A.

Figure 20A:
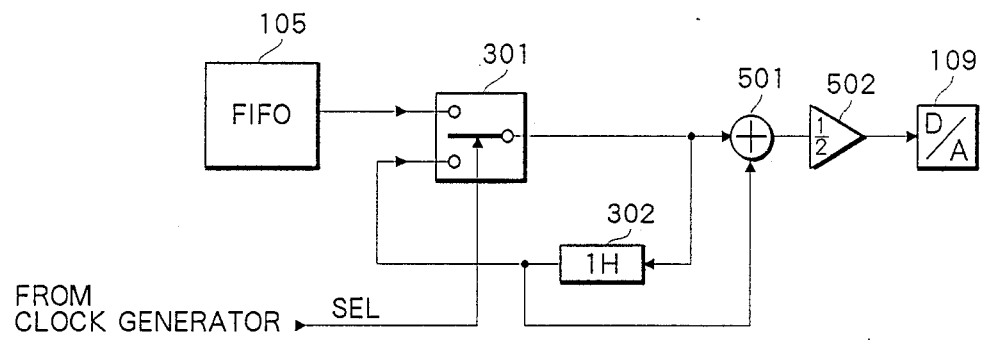
FIG. 20A is a block diagram showing an image expansion apparatus according to a modification of the second embodiment.
Figure 20B:
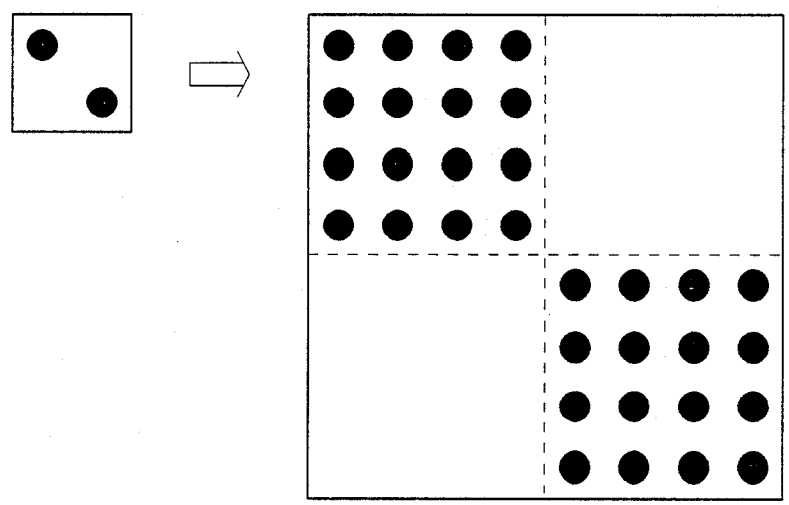
FIG. 20B is a view for describing the manner in which an unnatural edge is produced in the second embodiment.

The circuitry of FIG. 20A is obtained by a slight modification of the circuitry of FIG. 19A (second embodiment). In the image expansion apparatus of FIG. 20A, an added 501 and a multiplier 502 are provided between the selector 301 and the D/A converter 109, and the inputs to the adder 501 are the input and output of the 1H delay element 302. Since the entirety of the frame is displayed upon being delayed by 1H even if the output of selector 301 is D/A-converted as in the apparatus of FIG. 19A and even if the output of the 1H delay element is D/A-converted as in the apparatus of FIG. 20A, an expanded display is presented in an effective manner. However, since the image is displayed after being delayed by 1H in the apparatus of FIG. 20A, the displayed image is shifted one line downward. Accordingly, the signals on the input and output sides of the 1H delay element are added by the added 501, and the resulting sum is multiplied by ½ by means of the multiplier 502. The resulting product is the average of two lines. Consequently, an unnatural rapid change in edge of the kind shown in FIG. 20B is mitigated by this averaging process, thereby making the displayed image more attractive.

<THIRD EMBODIMENT>

Figure 21:
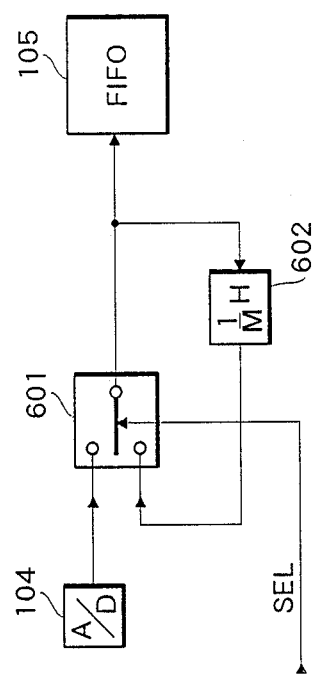
FIG. 21 is a block diagram showing a third embodiment of an image expansion apparatus according to the invention.

This embodiment is the same as the foregoing embodiments as far as image expansion is concerned but differs in that whereas the foregoing embodiments have the 1H delay circuitry located on the output side of the FIFO memory 105 (see FIGS. 1 and 17), the delay circuitry in this embodiment is located on the input side of the FIFO memory 105, as depicted in FIG. 21. The remaining portions of FIG. 21 are the same as in FIG. 19A. The amount of delay provided by a delay circuit 602 in this arrangement is (1/M)H. For example, when expansion is performed to double (i.e., M=2) the size of an image in the horizontal and vertical directions, the amount of delay is 0.5H. The changeover signal SEL in this case operates a selector 601 in such a manner that the selector will changeover every 0.5H. In other words, the period of SEL is 1H. Thus, image expansion is possible in the same manner even if the delay circuit is arranged in front of the FIFO memory 105.

Though it might appear that the scale of the delay circuit 602 can be reduced correspondingly owing to the smaller amount of delay, in actuality the scale of the circuitry (the number of delay stages) is the same. This is because the arrangement in which the delay circuit is situated in front of the FIFO memory is such that the amount of delay is (1/M)H and the operating clock is the same as the A/D converter clock, while in the arrangement where the delay circuit is disposed in back of the FIFO memory, the amount of delay is 1H but the operating clock is 1/M of the A/D converter clock. The control signal SEL selects the side of A/D converter 104 over the initial (1/M)H×RCLK interval and selects the side of the delay circuit 602 over the following (1−1/M)H×RCLK interval.

<ADVANTAGES OF THE INVENTION>

The embodiments described above provide the following advantages:

(1) By combining the FIFO image memory 105 and the 1H delay circuitry and using a few additional signals, image expansion can be realized independently in the main scanning direction, independently in the feed scanning direction or simultaneously in both the main and feed scanning directions without employing an address generator.

(2) Since the FIFO image memory 105 serves as a working memory for image expansion processing, the number of signal lines for driving the memory can be greatly reduced. This is advantageous in that wiring can be reduced and system reliability enhanced.

(3) The image data stored in the FIFO memory is composed of one field of data from the "start line", and the area of interest can be changed in successive fashion merely by changing the timing at which the control signal SEL is generated.

(4) Since the storage of data in the FIFO memory and the expansion of an image are carried out in pipeline fashion, the invention is well suited to real time processing, in which image expansion is performed at the same time as the image reading operation. The long time interval required, for example, between storage of image data in an image memory and subsequent setting of the address of an area to be expanded is eliminated.

(5) The effects set forth in this specification, especially the effects set forth in (1) through (4) above, are obtained in all of the first through third embodiments.

(6) In particular, with the second embodiment (FIG. 19A), the scale of the delay circuitry can be reduced. This contributes to a reduction in the size of the apparatus overall.

(7) Further, with the modification (FIG. 20A) of the second embodiment, the occurrence of unnatural edges in the display of an expanded image is prevented.

Figure 7A:
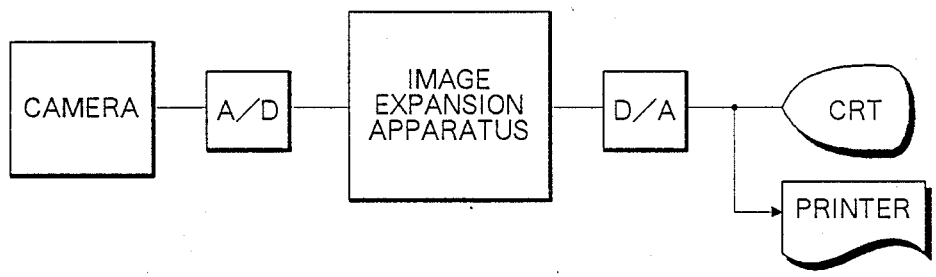
FIGS. 7A through 7C are views illustrating the configurations of systems to which the image expansion apparatus of the invention is capable of being applied.
Figure 7B:
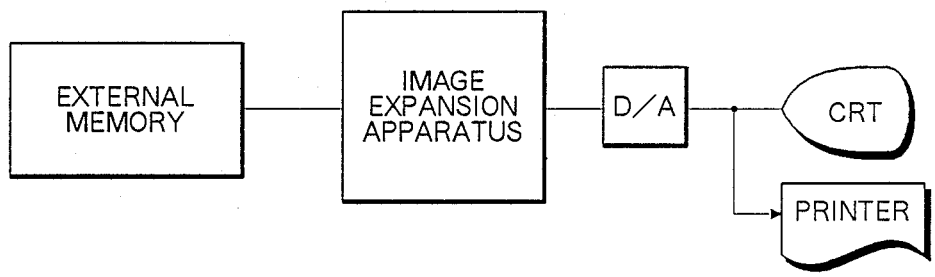
Figure 7C:
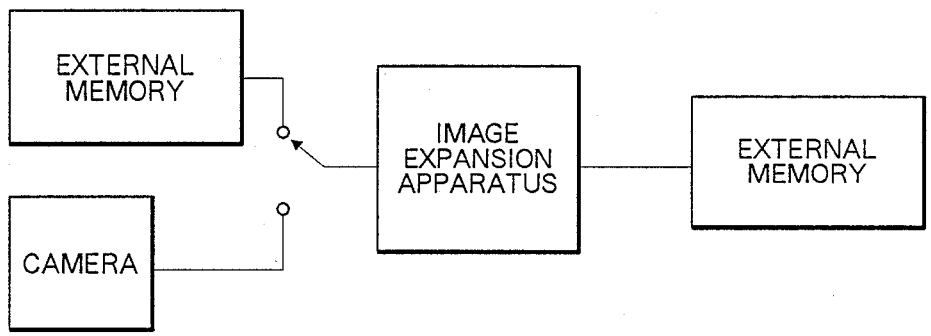

(8) The image expansion apparatus of the present invention can be applied to all of the systems shown in FIGS. 7A through 7C.

The present invention can be modified in a variety of ways without departing from the scope of the claims. For example, whereas an LSI-type FIFO memory is employed throughout the embodiments and modifications described hereinabove, a shift register that combines individual circuits such as standard logical IC's can be employed instead of the abovementioned FIFO memory.

Figure 22:
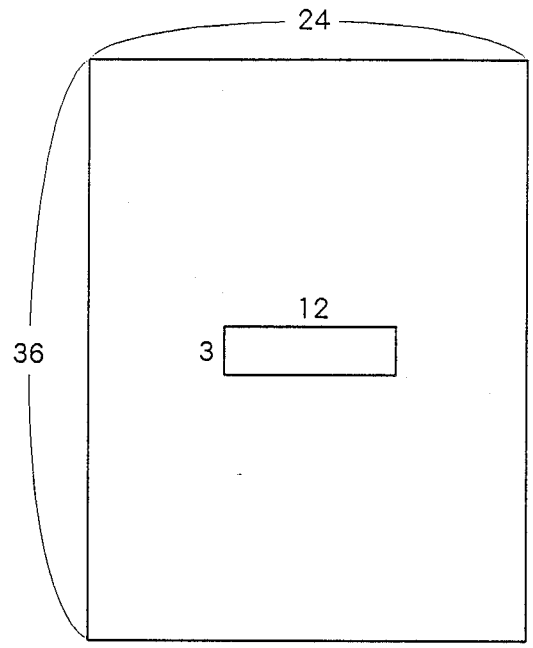
FIG. 22 is a view showing another example of an original image and area to be expanded to which the present invention can be applied.

Further, in the image expansion apparatus of the three embodiments and two modifications, the size of the original image is m×m pixels, as set forth in connection with FIG. 8, the size of the area of interest is k×k, the relation m=k×M holds with regard to m, k and magnification M, and the number of pixels in one field stored in the FIFO memory is $m^2/M$. However, it should be evident from the description of the foregoing embodiments that the invention is not limited thereto. This is because expansion at magnification M in the main scanning direction in the first through third embodiments is realized with the speed at which data is read from the FIFO memory being 1/M of the speed at which data is read from the FIFO memory. Further, in, say, the first embodiment and its modification, expansion at magnification M in the feed scanning direction is realized by cascade-connecting M-number of delay circuits, shifting image data read out of the FIFO memory into the M-number of delay circuits, and selecting outputs from each of the delay circuits line by line. In the second embodiment, expansion at magnification M in the feed scanning direction is realized by changing the duty ratio of the control signal SEL. Accordingly, as will be appreciated from this description, the essence of the first through third embodiments resides in establishing the relation m=k×M, with regard to expansion in the main scanning direction, between the size of the original image and the size of the area of interest in the main scanning direction, and effecting a delay M times with regard to expansion in the feed scanning direction. For this reason, a limitation on the size of the original image in the feed scanning direction and on the size of the image of interest in the feed scanning direction is in no way essential to the invention. Accordingly, by way of example, the invention can be applied to a case, shown in FIG. 22, in which the original image has a size of 24×36 pixels, the area of interest has a size of 12×3 pixels, and the magnification is 4X. In the example of the image shown in FIG. 22, the relation m=k×M is satisfied in the main scanning direction but not in the feed scanning direction. In order to expand this image by means of the apparatus of the first through third embodiments, it will suffice merely to control the length of time WENB is at logical "1" in such a manner that an area of 6×3 pixels is written in the FIFO image memory 105.

As many apparently widely different embodiments of the present invention can be made without departing from the spirit and scope thereof, it is to be understood that the invention is not limited to the specific embodiments thereof except as defined in the appended claims.

What is claimed is:

1. An image expansion apparatus for expanding an image two-dimensionally, comprising:
   an image memory for temporarily storing image data inclusive of an area to be expanded;
   reading means for successively reading image data, which has been written in said image memory, out of said image memory at a speed different from that at which the image data was written in said image memory;
   delay means for delaying, by a predetermined period of time, the image data read out of said image memory; and
   selecting means for alternately selecting, at a predetermined time interval, image data which has and has not passed through said delay means.

2. The apparatus according to claim 1, wherein said apparatus is an apparatus for expanding an image in a horizontal direction and a vertical direction, and further comprises writing means for writing image data, which has been read by a raster scanning method, in said image memory;
   the reading speed of said reading means being decided based on magnification at which expansion is performed in the horizontal direction and the speed at which the image data is written in said image memory;
   said delay means delaying the image data for a period of time decided based upon a number of pixels, which is decided on the basis of a number of pixels of the image in the horizontal direction and magnification in the vertical direction, and the speed at which the data is read out of the image memory.

3. The apparatus according to claim 2, wherein said delay means has a number of shift register means corresponding to the magnification in the vertical direction, these shift register means being cascade-connected, each shift register means having a capacity for the number of pixels of the image on one horizontal line;
   said selecting means selecting final-stage outputs of the shift registers in sequential order.

4. The apparatus according to claim 2, wherein the relation m=k×M holds, where m×m is the size of an original image, k×k is the size of the area to be expanded, and magnification is M in both a main scanning direction and a feed scanning direction.

5. An image expansion apparatus for expanding an image two-dimensionally, comprising:
   a FIFO-type image memory for storing, in first-in, first-out fashion, image data inclusive of an area to be expanded;
   a writing circuit for writing the image data in said FIFO-type image memory at a predetermined writing speed;
   a reading circuit for successively reading the image data, which has been written in said FIFO-type image memory, out of said FIFO-type image memory at a reading speed different from that which the image data was written in said FIFO-type image memory;
   a delay circuit for delaying, by a predetermined period of time, the image data read out of said FIFO-type image memory; and
   a selecting circuit for alternately selecting, at a predetermined time interval, image data which has and has not passed through said delay circuit.

6. The apparatus according to claim 5, wherein the image comprises image data read by a raster scanning method, said apparatus is an apparatus for expanding an image in a horizontal direction and a vertical direction;
   the reading speed of said reading circuit being decided based on magnification at which expansion is performed in the horizontal direction and the speed at which the image data is written in said FIFO-type image memory;
   said delay circuit delaying the image data for a period of time decided based upon a number of pixels, which is decided on the basis of a number of pixels of the image in the horizontal direction and magnification in the vertical direction, and the speed at which the data is read out of the FIFO-type image memory.

7. The apparatus according to claim 6, wherein said delay circuit has a number of shift register means corresponding to the magnification in the vertical direction, these shift register means being cascade-connected, each shift register means having a capacity for the number of pixels of the image on one horizontal line;
   said selecting circuit selecting final-stage outputs of the shift registers in sequential order.

8. The apparatus according to claim 6, wherein the relation m=k×M holds, where m×m is the size of an original image, k×k is the size of the area to be expanded, and magnification is M in both a main scanning direction and a feed scanning direction.

9. The apparatus according to claim 8, wherein said writing circuit writes image data in an amount of $m^2/M$ pixels in said FIFO-type image memory starting from a start line of the area to be expanded.

10. The apparatus according to claim 8, wherein said writing circuit successively writes image data over a period of two frames in an amount of $m^2/M$ pixels in said FIFO-type image memory starting from a start line of the area to be expanded, and said reading circuit initially reads image data in an amount of $m^2/M$ pixels of the frame initially written in said FIFO-type image memory.

11. An image expansion apparatus for expanding an image, comprising:

a FIFO-type image memory for storing, in first-in, first-out fashion, image data inclusive of an area to be expanded;

a writing circuit for writing the image data in said FIFO-type image memory at a predetermined writing speed;

a reading circuit for successively reading the image data, which has been written in said FIFO-type image memory, out of said FIFO-type image memory at a predetermined reading speed;

a two-input selecting circuit for alternately switching between and outputting its two inputs in response to a predetermined control signal, said selecting circuit being connected to said FIFO-type image memory and having data read out of said FIFO-type image memory as one of its inputs; and a delay circuit connected to an output side of said selecting circuit for delaying, by a predetermined period of time, input data applied thereto, an output of said delay circuit being connected to the other one of the inputs of said selecting circuit.

12. The apparatus according to claim 11, wherein the image comprises image data read by a raster scanning method, and said apparatus is an apparatus for expanding an image in a horizontal direction and a vertical direction;

the reading speed of said reading circuit being decided based on magnification at which expansion is performed in the horizontal direction and the speed at which the image data is written in said FIFO-type image memory;

said delay circuit delaying the image data for a period of time decided based upon a number of pixels, which is decided on the basis of a number of pixels of the image in the horizontal direction and magnification in the vertical direction, and the speed at which the data is read out of the FIFO-type image memory.

13. The apparatus according to claim 11, wherein said apparatus expands the image at a magnification M in a feed scanning direction;

said delay circuit including one shift register having a capacity for the number of pixels of the image on one horizontal line;

said predetermined control image signal having logic values such that said selecting circuit selects an output of said FIFO-type image memory over an interval equivalent to a number of pixels on one line multiplied by the writing speed, and selects an output of said delay circuit over an interval equivalent to a number of pixels on $M-1$ lines multiplied by the writing speed.

14. The apparatus according to claim 13, further comprising a circuit for averaging the output of said selecting circuit and the output of said delay circuit.

15. The apparatus according to claim 11, wherein the relation $m = k \times M$ holds, where $m \times m$ is the size of an original image, $k \times k$ is the size of the area to be expanded, and magnification is M in both a main scanning direction and a feed scanning direction.

16. The apparatus according to claim 15, wherein said writing circuit writes image data in an amount of $m^2/M$ pixels in said FIFO-type image memory starting from a start line of the area to be expanded.

17. The apparatus according to claim 16, wherein said writing circuit successively writes an image data over a period of two frames in an amount of $m^2/M$ pixels in said FIFO-type image memory starting from a start line of the area to be expanded, and said reading circuit initially reads image data in an amount of $m^2/M$ pixels of the frame initially written in said FIFO-type image memory.

18. An image expanding apparatus for expanding an image, comprising:

a two-input selecting circuit for alternately switching between and outputting its two inputs in response to a predetermined control signal, one of the inputs of said selecting circuit being image data which includes an area to be expanded;

a delay circuit for delaying an output of said selecting circuit by a predetermined period of time, an output of said delay circuit being the other input of said selecting circuit;

a FIFO-type image memory for storing, in first-in, first-out fashion, the output of said delay circuit;

a writing circuit for writing the image data in said FIFO-type image memory at a predetermined writing speed; and a reading circuit for successively reading the image data, which has been written in said FIFO-type image memory, out of said FIFO-type image memory at a predetermined reading speed.

19. The apparatus according to claim 18, wherein the time delay of said delay circuit is an interval equivalent to the product of a number of pixels on one line and the writing speed, multiplied by 1/M.

20. The apparatus according to claim 18, wherein said apparatus expands the image at a magnification M in a feed scanning direction;

the time delay of said delay circuit being an interval equivalent to a number of pixels on one horizontal line of an original image multiplied by the writing speed.

21. The apparatus according to claim 20, wherein the relation $m = k \times M$ holds, where $m \times m$ is the size of an original image, $k \times k$ is the size of the area to be expanded, and magnification is M in both a main scanning direction and a feed scanning direction.

* * * * *

UNITED STATES PATENT AND TRADEMARK OFFICE
CERTIFICATE OF CORRECTION

PATENT NO. : 4,891,702

DATED : January 2, 1990

INVENTOR(S) : Tadayoshi Nakayama, et al

It is certified that error appears in the above-identified patent and that said Letters Patent is hereby corrected as shown below:

COLUMN 2

Line 46, "which" should read --at which--.

COLUMN 3

Line 63, "FIG. 19a" should read --FIG. 19A--.

COLUMN 6

Line 26, "enable signals WENB, REND" should read --enable signals WENB, RENB--.

COLUMN 7

Line 67, "abovementioned" should read --above-mentioned--.

COLUMN 8

Line 54, "out" should read --out of--.

COLUMN 9

Line 28, "and and" should read --and an--.

UNITED STATES PATENT AND TRADEMARK OFFICE
CERTIFICATE OF CORRECTION

PATENT NO. : 4,891,702

DATED : January 2, 1990

INVENTOR(S) : Tadayoshi Nakayama, et al

It is certified that error appears in the above-identified patent and that said Letters Patent is hereby corrected as shown below:

COLUMN 11

Line 1, "abovementioned" should read --above-mentioned--.
    Line 14, "obtained" should read --obtaining--.
    Line 21, "M=4)." should read --(M=4).--.
    Line 30, "having" should read --has--.

COLUMN 13

Line 1, "smoothened" should read --smoothed--.
    Line 6, "added 501" should read --adder 501--.
    Line 19, "added 501," should read --adder 501,--.

COLUMN 14

Line 16, "real time" should read --real-time--.
    Line 41, "abovementioned" should read --above-mentioned--.

COLUMN 16

Line 15, "which" should read --at which--.

COLUMN 17

Line 49, "image" should be deleted.

UNITED STATES PATENT AND TRADEMARK OFFICE
CERTIFICATE OF CORRECTION

PATENT NO. : 4,891,702

DATED : January 2, 1990

INVENTOR(S) : Tadayoshi Nakayama, et al

It is certified that error appears in the above-identified patent and that said Letters Patent is hereby corrected as shown below:

COLUMN 18

Line 14, "an" should be deleted.

Signed and Sealed this

Twenty-second Day of September, 1992

Attest:

DOUGLAS B. COMER

Attesting Officer    Acting Commissioner of Patents and Trademarks